United States Patent
Ciszak et al.

(10) Patent No.: US 7,204,782 B2
(45) Date of Patent: Apr. 17, 2007

(54) AXLE ASSEMBLY

(75) Inventors: Robert J. Ciszak, Bay Village, OH (US); Joe Pleichner, Painesville Township, OH (US); Paul D. Pochatila, Mentor, OH (US)

(73) Assignee: Euclid-Hitachi Heavy Equipment, Ltd., Cleveland, OH (US)

( * ) Notice: Subject to any disclaimer, the term of this patent is extended or adjusted under 35 U.S.C. 154(b) by 0 days.

(21) Appl. No.: 10/399,199

(22) PCT Filed: Jan. 24, 2003

(86) PCT No.: PCT/US03/02335

§ 371 (c)(1),
(2), (4) Date: Apr. 11, 2003

(87) PCT Pub. No.: WO03/066359

PCT Pub. Date: Aug. 14, 2003

(65) Prior Publication Data

US 2004/0065169 A1    Apr. 8, 2004

Related U.S. Application Data

(60) Provisional application No. 60/355,672, filed on Feb. 7, 2002.

(51) Int. Cl.
*F16H 57/08*   (2006.01)
(52) U.S. Cl. ...................................... 475/331
(58) Field of Classification Search ............... 475/331, 475/346–347; 180/372
See application file for complete search history.

(56) References Cited

U.S. PATENT DOCUMENTS 1,818,447 A    8/1931  Baker
2,726,553 A *  12/1955 Le Tourneau ............... 74/410
2,764,040 A *  9/1956  Butler ........................ 475/31
2,802,542 A    8/1957  Gerst
2,900,845 A *  8/1959  Tielens ....................... 475/47
3,770,074 A    11/1973 Sherman
3,943,780 A *  3/1976  Klaue ....................... 475/317
3,945,270 A *  3/1976  Nelson et al. ............... 476/61
4,020,716 A    5/1977  Toth et al.
4,198,863 A *  4/1980  Bartek et al. ................ 73/430
4,334,590 A *  6/1982  Plumb ...................... 180/247
4,380,274 A    4/1983  Abraham et al.
4,437,530 A    3/1984  De Young et al.
4,583,428 A *  4/1986  Garnier ..................... 475/346

(Continued)

FOREIGN PATENT DOCUMENTS

JP    61160649 A  *  7/1986

(Continued)

*Primary Examiner*—Sherry Estremsky
(74) *Attorney, Agent, or Firm*—Tarolli, Sundheim, Covell & Tummino, LLP

(57) ABSTRACT

An axle assembly including a housing, a tire supporting hub mounted for rotation with respect to the housing, a drive axle and a planetary unit for coupling the drive axle to the tire supporting hub. The planetary unit includes a sun gear, at least one planet gear and a ring gear, with the planet gear being in co-meshing engagement with the sun and ring gears. Damping material is used to inhibit or reduce the transmission of vibrations produced by the gear meshes during vehicle operation to the planetary unit cover. In one construction, the planetary unit includes a cover portion and a carrier portion with damping material, such as copper, disposed between the portions. In another construction, bushings made from damping material, such as brass or bronze, are disposed between the planetary gear (or gears) and the pin member which supports the planetary gear.

13 Claims, 5 Drawing Sheets

U.S. PATENT DOCUMENTS

| | | | |
|---|---|---|---|
| 4,885,959 A * | 12/1989 | Shinjo et al. | 475/347 |
| 5,382,854 A * | 1/1995 | Kawamoto et al. | 310/67 R |
| 5,679,089 A * | 10/1997 | Levedahl | 475/332 |
| 5,992,913 A * | 11/1999 | Becker et al. | 295/21 |
| 6,033,335 A * | 3/2000 | Hotta et al. | 475/269 |
| 6,394,924 B1 * | 5/2002 | Schiebold et al. | 475/5 |
| 6,458,057 B2 | 10/2002 | Massaccesi et al. | |

FOREIGN PATENT DOCUMENTS

| | | | |
|---|---|---|---|
| JP | 63314996 A | * | 12/1988 |
| JP | 5171319 A | * | 12/1991 |
| JP | 08042672 A | * | 2/1996 |
| JP | 10252837 A | * | 9/1998 |

* cited by examiner

AXLE ASSEMBLY

CROSS-REFERENCE TO RELATED APPLICATION

The present application is a 371 of PCT/US03/02335, filed Jan. 24, 2003, which claims priority from U.S. Ser. No. 60/355,672, filed Feb. 7, 2002.

TECHNICAL FIELD

The present invention relates generally to planetary drives and in particular to an apparatus and method for reducing noise generated by a planetary unit during vehicle operation.

BACKGROUND ART

Large off-highway haul vehicles, such as those used in open pit mines, quarries, etc., typically use outboard mounted, planetary drives as part of drive axle assembly. These outboard planetary drives act as gear reducers between the drive axle and the tire hub. The planetary unit reduces the rotational speed of the hub relative to the drive axle speed and acts as torque multiplier.

Since substantial torques are transmitted through the planetary unit, they are typically constructed of robust components. In at least some cases, spur gears are used for the sun gear and planet gears. Helical gearing is also used for some units. It has been found, that significant noise levels are produced by the planetary units during vehicle operation. This noise may be generated by the gears themselves, and/or vibrations generated in the units. Since the planet gears are carried by a planet carrier which typically forms a part of the planetary cover, vibrations generated in the planetary are transmitted to the cover which in affect act as a speaker or drum head and converts vibrations to noise. It has been found that the noise generated by the planetary units of the these types of vehicles can be objectionable especially in open pit mines near communities.

The noise generated by the hub reduction gearing comes from two discrete sources. The first noise is generated by the gear teeth coming into and out of mesh. This sliding action generates noise. The amount of noise generated by the mesh itself depends on the tooth profile, pressure angle, and quality class of gear, and accuracy of the housing. The second source of noise is due to the stiffness of the housing or carrier. Since off-highway equipment demands very high tractive effort, the carriers must be made from steel or ductile iron. The carriers must also be very rigid to effectively keep the gear teeth aligned properly. The stiffness combined with the material properties place the natural frequency of the planet carrier within the operating frequency of the gear reduction. When the geartrain operates at or near the natural frequency of the carrier, high sound pressure is the result. The natural frequency of the carrier can, in theory be changed by changing the stiffness of the part. However as a practical matter there are not viable alternate materials (having a stiffness different from steel or iron) from which to construct the carrier that can withstand the forces and torques generated during the operation of the vehicle

DISCLOSURE OF THE INVENTION

The present invention provides a new and improved axle assembly for use with a land vehicle, such as an off-highway hauling vehicle. According to the invention, the axle assembly includes an axle housing, a tire supporting hub mounted for rotation with respect to the housing, a drive axle and a planetary unit for operatively coupling the drive axle to the tire supporting hub, such that rotation in the drive axle produces attendant rotation in the hub. The planetary unit includes a sun gear, at least one planet gear and a ring gear; the planet gear is located in co-meshing engagement with the sun gear and the ring gear. The planetary unit includes a planetary cover that includes a gear support for supporting at least one of the gears located within the planetary unit. Damping material forming part of the planetary unit is operative to reduce the transmission of vibrations, generated by meshing of gears within the planetary unit during vehicle operation, to the planetary covers.

In one preferred and illustrated embodiment, the planetary cover includes a cover portion and a carrier portion. Damping material is disposed intermediate the cover portion and the carrier portion. In the preferred and illustrated embodiment, the damping material comprises a sheet or plate. In a more preferred embodiment, the sheet of material comprises copper. The invention, however, contemplates other damping materials, such as lead, plastics, etc. In general suitable damping materials must be softer than the material from which the cover and carrier portions of the planet unit are manufactured and must also be able to withstand the substantial clamping forces that are exerted on the material when the cover portion and carrier portion are secured together.

In the preferred and illustrated embodiment, the carrier portion serves as a support for the planet gear or planet gears if a multitude of gears are employed between the sun gear and ring gear.

In another preferred and illustrated embodiment, the damping material comprises inserts or bushings made of a material, such as brass or bronze that is dissimilar to the material from which the planetary cover is constructed. The bushings of dissimilar material are disposed intermediate the planetary gear (or gears) and a planet gear supporting member, such as a pin. The bushing may be mounted within and form part of the planet gear itself and rotatable therewith. Alternately, the bushing may be mounted to the pin and the planet gear being rotatable with respect to the bushing. More specifically, the planet gear is typically supported for rotation by a ball or roller bearing that is located intermediate the gear and the support pin. The bushing made of damping of material can be either fixed to the gear and rotatable with an outer race of the bearing or, alternately, fixed to the pin and located between the stationary inner race of the bearing and the pin.

The present invention provides an extremely cost effective method for reducing noise that typically emanates from a planetary unit, especially when used on a large hauling vehicle. The noise is typically generated by the meshing of gears that occurs within the planetary unit during vehicle operation. In prior art designs, the vibrations produced by the gear meshes are transmitted directly to the cover which then also vibrates acting as a drum head, thus producing significant noise. The damping material whether used as a sheet material between a cover portion and a carrier portion, or as bushings located between the planet gears and the planet gear support pins, convert these vibrations to heat, thus dissipating the vibration and substantially reducing the noise generated by the gear meshes.

Additional details and features of the invention will become apparent and a fuller understanding obtained by reading the following detailed description made in connection with the accompanying drawings.

BEST MODE FOR CARRYING OUT THE INVENTION

Figure 1:
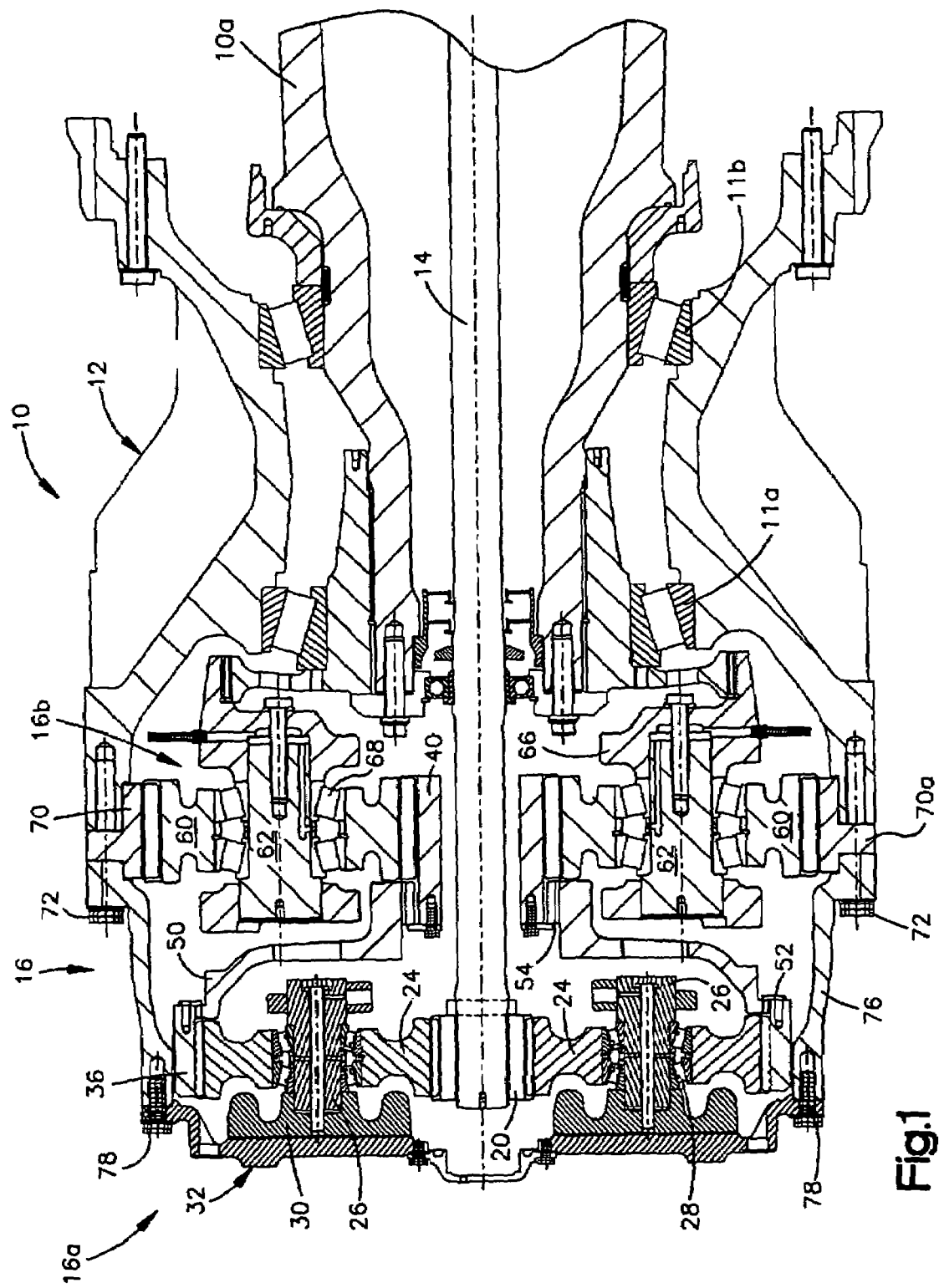
FIG. 1 is a fragmentary sectional view of a drive axle assembly incorporating the present invention.

A portion of a drive axle assembly 10 constructed in accordance with a preferred embodiment of the invention is illustrated in FIG. 1. The illustrated drive axle assembly is typically used in large off-highway hauling vehicles such as haul vehicles used for mining operations. The invention, however, is applicable to other types of vehicles and should not be limited to the drive axle assembly shown in FIG. 1 or the type of vehicle in which the illustrated drive axle assembly is typically found.

In the illustrated axle, a tire supporting hub indicated generally by the reference character 12 is driven by an axle shaft 14 via, an outboard mounted epicyclic gear train indicated generally by the reference character 16. As is conventional, the hub 12 may be rotatably supported near the outboard end of an axle housing 10a by roller bearings 11a, 11b. The drive axle 14, in some vehicles is connected to a centrally mounted differential while in other vehicles of this type, the axle 14 is connected to the output shaft, or forms the output shaft, of an electric traction motor.

The gear train 16 includes a pair of side-by-side planetary gear sets indicated generally by the reference characters 16a, 16b. The outermost planetary gear set 16a is driven directly by the axle 14 and includes a sun gear 20 splined to the distal end of the axle 14. The sun gear 20 is gear coupled to a plurality of planetary gears 24 which rotate on associated shafts 26 that are held in a spatial relationship by a carrier 30 which forms part of a planetary cover 32. The planet gears 24 are supported for rotation about the planet gear pins 26 by roller bearings 28. The planetary gears 24 are in constant mesh with the sun gear 20 as well as a ring gear 36.

The ring gear 36 is operatively coupled to a sun gear 40 forming part of the inboard planetary gear set 16b. In particular, the ring gear 36 is coupled to the sun gear 40 by means of coupling member 50 which includes an external spline 52 that mates with the ring gear 36 and an internal spline 54 that mates with the sun gear 40. The second planetary set 16b includes a plurality of planet gears 60 rotatably mounted on planet pins 62 which are held in a spatial relationship by a carrier 66. In the illustrated embodiment, the planet gears 60 are rotatably supported on the pins 62 by roller bearings 68. The planet gears 60 are in constant mesh with the inboard sun gear 40 and an inboard ring gear 70. The inboard ring gear 70 includes a flange 70a that is clamped to the hub 12 by bolts 72.

The planetary gear cover 32 which is connected to the planet carrier 30 is also coupled to the hub 12 by a torque transmitting cover segment 76 which is bolted to the planetary cover 32 by bolts 78 and which is also held to the ring gear flange 70a and hub 12 by the bolts 72. In the disclosed planetary arrangement, a portion of the torque, i.e. 20 percent is transmitted to the hub 12 via the outboard planetary unit 16a and the remainder of the torque, i.e. 80 percent is transmitted by the inboard planetary unit 16b. In general, the relative sizes of the ring gears 36, 70 determine the proportion of the torque that is transmitted by the gears set 16a, 16b. A more detailed explanation of the operation of the illustrated gear train can be found in U.S. Pat. No. 4,437,530, which is hereby incorporated by reference. It should be noted that the illustrated gear train which includes a pair of planetary gear sets is presented for illustrative purposes only. The invention is equally applicable to other types of planetary drives including drives that utilize only one planetary gear set. However, it should be also noted that in the illustrated embodiment, the gearing of the outboard planetary unit 16a typically operates at a frequency close to that of the natural frequency of the planetary cover/carrier and hence the present invention will be disclosed in connection with the outboard planetary unit 16a only.

Figure 2:
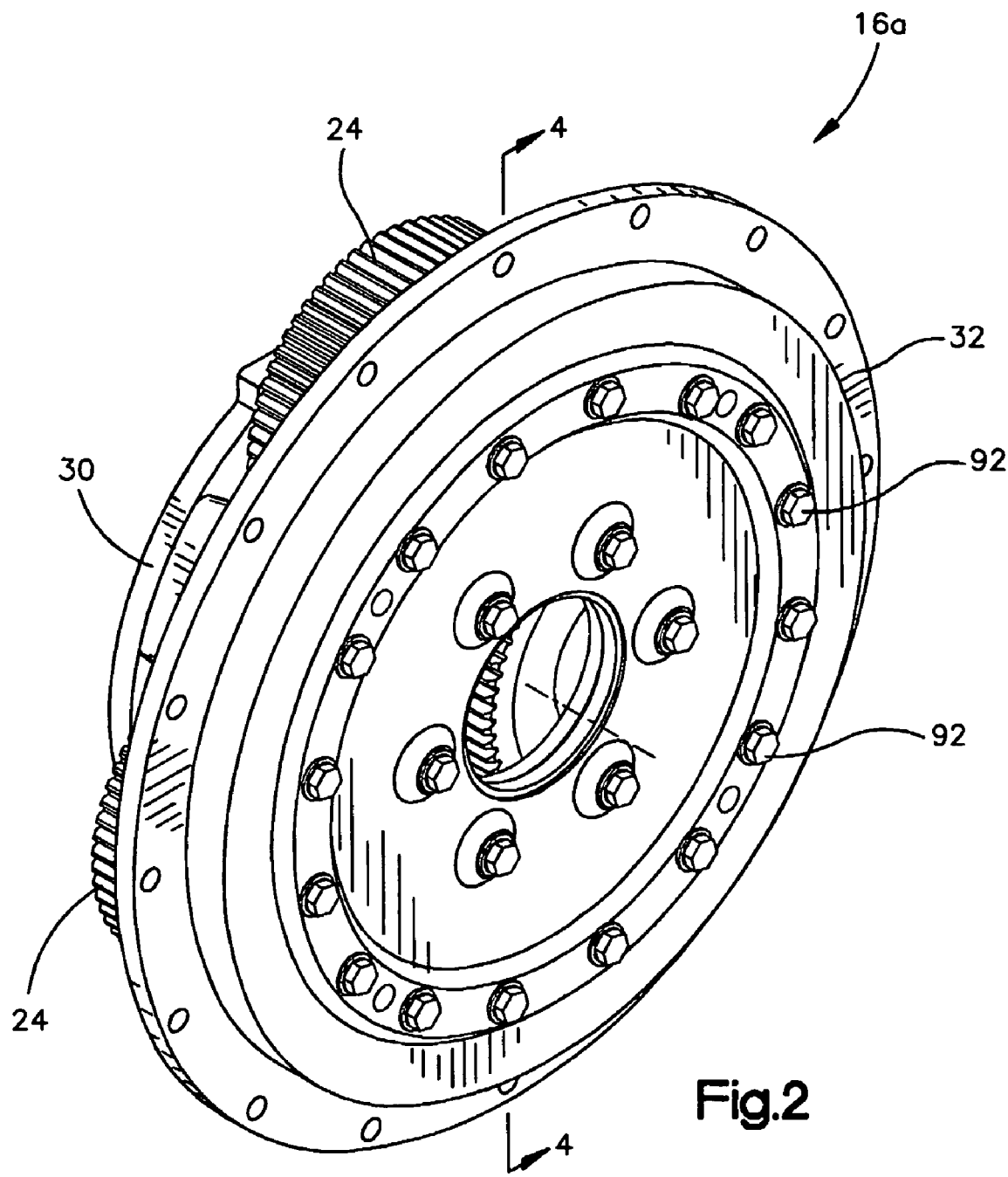
FIG. 2 is a perspective view of a planetary drive unit forming part of the drive axle assembly shown in FIG. 1.
Figure 3:
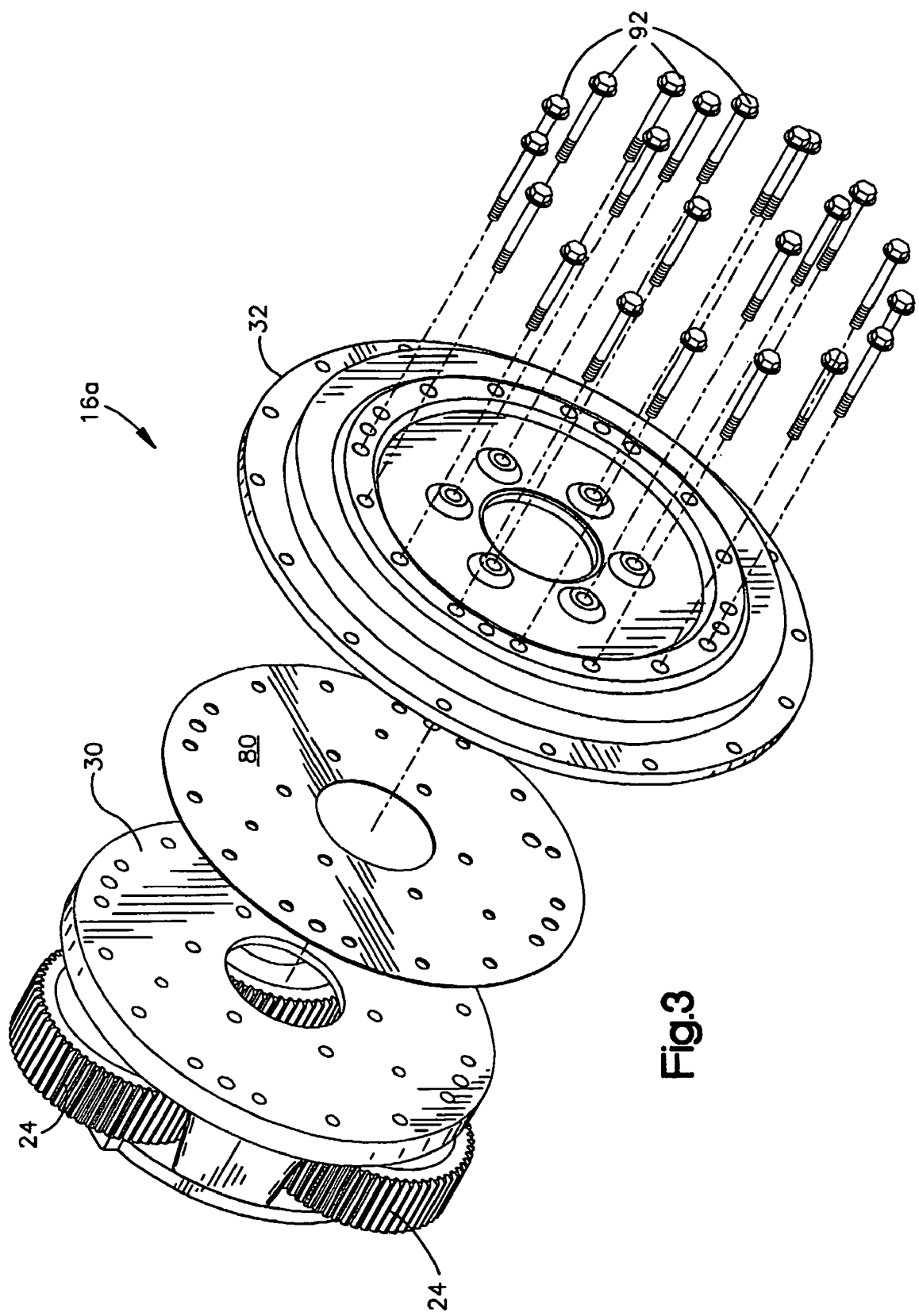
FIG. 3 is an exploded view of the planetary unit shown in FIG. 2.
Figure 4:
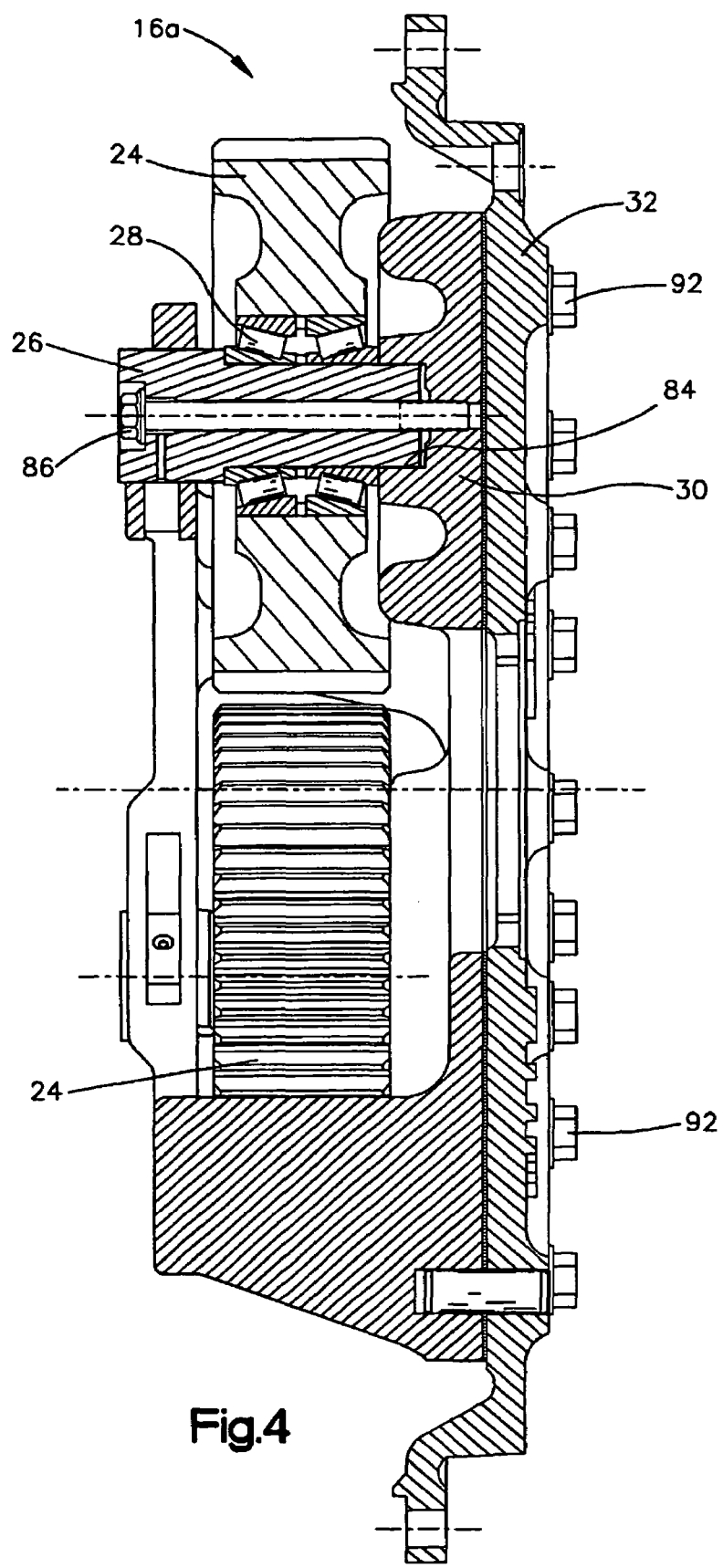
FIG. 4 is a sectional view of the planetary unit as seen from the plane indicated by the line 4—4 in FIG. 2.

Turning now to FIGS. 2–4, further details of the outboard planetary unit 16a which is constructed in accordance with the present invention will be described. The planetary cover 32 is secured to the planet carrier 30 by a plurality of bolts 92. In many if not most prior art constructions, the cover 32 and carrier 30 are formed as a one piece, integral unit. In accordance with the invention, the planetary cover 32 and carrier 30 are constructed as separate elements and a sheet of copper or other friction damping material is sandwiched between the cover 32 and the carrier 30 (best shown in FIG. 3). It has been found that the placement of a copper sheet 80 between the planetary cover 32 and the planet carrier 30 substantially reduces the gear noise and noise generated by the natural frequency of the carrier that is typically transmitted to the planetary cover 32. A significant sound reduction is realized during operation of the vehicle by placing a suitable sound absorbing/friction damping material such as copper sheeting 80 between the planet carrier 30 and the planetary unit cover 32.

Additional details of the construction of the planetary unit 16a are illustrated in FIG. 4. The planet gear pins 26 are held in bores 84 machined in the planet carrier 30 by bolts 86 which extend through the pins 26 and threadedly engage the carrier 30. With the planetary cover 32 bolted to the carrier 30 (by the bolts 92) a cover/carrier assembly is provided having a rigidity comparable to units having single piece cover/planet carrier. The copper sheet disposed between the carrier 30 and the cover 32 substantially reduces gear noise or noise produced by vibrations generated during operation of the vehicle.

The disclosed cover/carrier assemble (including the copper sheet 80) 30, 32 which defines a frictional joint utilizing a dissimilar material (copper) effectively changes the mechanical vibrations of the carrier into heat energy before reaching the outermost portion of the carrier. In particular, the damping material (i.e. copper) allows the carrier 30 and cover 32 to slide relative to one another thereby converting mechanical vibrations into heat energy This significantly reduces the sound pressure level at ground level around the geared reduction.

In the preferred and illustrated embodiment, copper is identified as a material that is suitable for isolating the cover 32 from the planet carrier 30. It is believed, however, that other materials such as lead, copper/brass alloys, polycarbonate, other high strength plastics or synthetics, etc. can be used as a friction damping/noise reducing material between the planetary cover 32 and the planet carrier 30.

In the preferred and illustrate embodiment, a frictional joint for converting mechanical vibration to heat energy is provided by separating the carrier 30 and planetary cover 32 by a sheet of damping material such as copper. In an alternate embodiment, a frictional damping material can be placed between the planet gear pins 26 and the planet gears 24. In particular, bushings made from materials dissimilar from the materials from which the pins 26 or gears 24 are made may be utilized.

Figure 5:
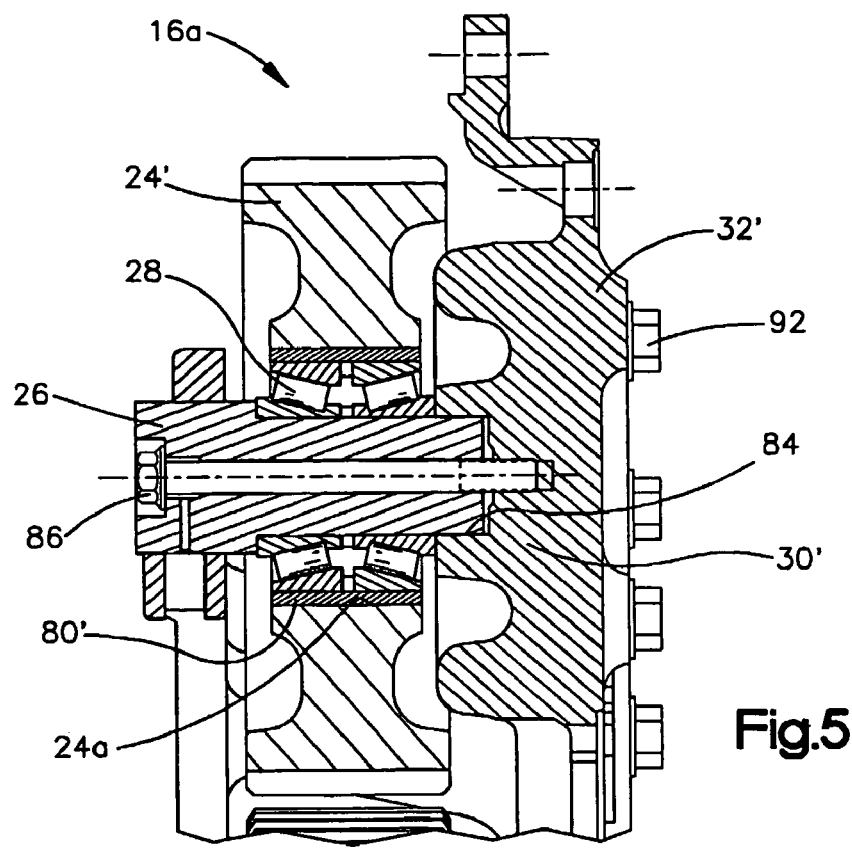
FIG. 5 is a fragmentary sectional view of a planetary unit similar to the one shown in FIG. 4, which illustrates an alternate embodiment of the invention; and, FIG. 6 is another fragmentary sectional view of a planetary unit showing another embodiment of the invention.

For example and as shown in FIG. 5, bronze bushings 80' may be fitted to inside bore 24a of each planet gear 24' so that the planet gear 24' is separated from its associated roller bearing by the bushing 80'. This bushing would serve the same purpose as the copper sheet 80 in the preferred embodiment. In particular, vibrations due to gear meshes etc. generated by the planet gear 24' would be converted to heat energy rather than being transmitted directly to a carrier/cover 30' via the planet gear pins 26 (in this embodiment a planetary cover portion 32' and the carrier portion 30' may comprise a unitary component).

Figure 6:
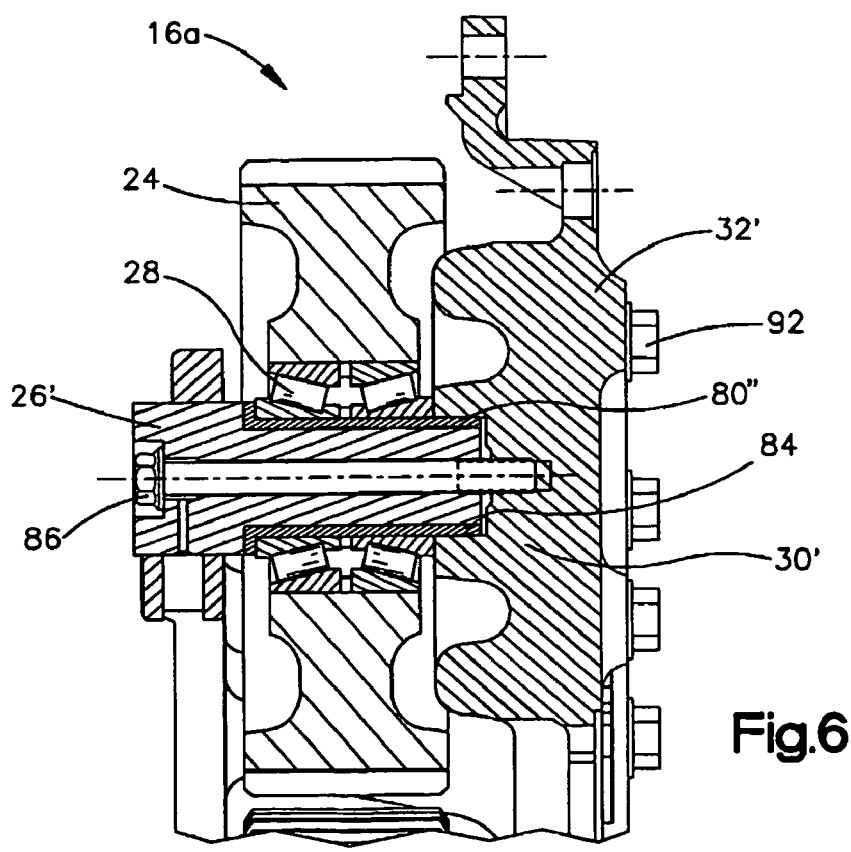

Referring to FIG. 6, bushings 80" may be mounted to form part of planet gear supporting pins 26' so that the planet gear 24 and its associated roller bearing are separated from the pin 26' by the bushing 80". Alternately, bushings 80', 80" may be mounted in the planet gears 24' and on planet gear pins 26' so that there are two (2) damping interfaces between the planet gears and their associated support pins.

Although the invention has been described with a certain degree of particularity, it should be understood that those skilled in the art can make various changes to it without departing from the spirit or scope of the invention as hereinafter claimed.

We claim:

1. A planetary unit for providing gear reduction between a drive axle and tire hub, comprising:
   a) a centrally located sun gear operatively connected to the drive axle;
   b) a plurality of planet gears in co-meshing relationship with said sun gear;
   c) a ring gear in co-meshing relationship with said planet gears and operatively connected to said hub;
   d) a planetary cover/carrier assembly defining a frictional joint for converting vibrations generated by gear meshes of said planet gears into heat energy; and,
   e) said planetary cover/carrier assembly including a separate planetary cover and carrier with a sheet of friction damping material disposed and clamped between planar surfaces defined by said planetary cover and carrier.

2. A planetary unit for providing gear reduction between a drive axle and tire hub, comprising:
   a) a centrally located sun gear operatively connected to the drive axle;
   b) a plurality of planet gears in co-meshing relationship with said sun gear;
   c) a ring gear in co-meshing relationship with said planet gears and operatively connected to said hub;
   d) a planetary cover/carrier assembly defining a frictional joint for converting vibrations generated by gear meshes of said planet gears into heat energy; and,
   e) said frictional joint being provided by bushings made of material dissimilar to that of the material from which said carrier is constructed, said bushings disposed intermediate to said planet gears and associated planet gear supporting pin elements, said pin elements rigidly connected to said carrier.

3. The apparatus of claim 2 wherein said elements are pins.

4. A drive axle assembly for a land vehicle comprising:
   a) a tire supporting hub mounted for rotation;
   b) a drive axle;
   c) a planetary unit for operatively coupling said drive axle to said hub, such that rotation in said drive axle produces rotation in said hub;
   d) said planetary unit including:
      i) a sun gear, at least one planet gear and a ring gear, said planet gear being in co-meshing engagement with said sun gear and said ring gear;
      ii) a planetary unit cover including a gear carrier for operatively supporting at least one of said gears;
      iii) damping material forming part of said planetary unit for reducing the transmission of vibrations generated by gear meshes of said gears to said planetary cover; and,
      iv) said planetary cover including a cover portion and a carrier portion and said damping material comprises a sheet of material dissimilar to that of the material from which said cover and carrier portions are constructed, that is disposed intermediate said cover portion and said carrier portion.

5. The axle of claim 4 wherein said drive axle drivingly engages said sun gear and said carrier portion rotatably supports said planet gear.

6. The axle of claim 4, wherein said sheet of damping material comprises a sheet of copper.

7. A drive axle assembly for a land vehicle comprising:
   a) a tire supporting hub mounted for rotation;
   b) a drive axle;
   c) a planetary unit for operatively coupling said drive axle to said hub, such that rotation in said drive axle produces rotation in said hub;
   d) said planetary unit including:
      i) a sun gear, at least one planet gear and a ring gear, said planet gear being in co-meshing engagement with said sun gear and said ring gear;
      ii) a planetary unit cover including a gear carrier for operatively supporting at least one of said gears;
      iii) damping material forming part of said planetary unit for reducing the transmission of vibrations generated by gear meshes of said gears to said planetary cover; and,
      iv) said damping material comprising at least one bushing constructed of a material that is dissimilar from the material from which said planetary cover is constructed, said bushing disposed between said planet gear and a rigid pin member that rotatably supports said planet gear.

8. An axle assembly for a land vehicle, comprising;
   a) an axle housing;
   b) a tire supporting hub rotatably supported by said housing;
   c) a drive axle;
   d) a planetary unit including a sun gear operatively coupled to said axle and rotatable therewith and a ring gear operatively coupled to said hub;
   e) at least one planet gear in co-meshing engagement with said sun gear and said ring gear;
   f) a planetary cover;
   g) a planet carrier rotatably supporting said planet gear and mounted to said planetary cover;

h) a damping element disposed between said planetary cover and said carrier for reducing the transmission of gear related vibrations to said planetary cover; and, i) said damping element comprising a sheet material dissimilar to that of the material from which said planetary cover and planet carrier are constructed, that is disposed intermediate said planetary cover and said planet carrier.

9. The axle assembly of claim 8, wherein said ring gear is operatively coupled to said tire hub, via a second planetary unit.

10. The axle assembly of claim 8, wherein said one planetary unit includes a plurality of planet gears, all rotatably supported by said planet carrier.

11. The axle assembly of claim 8, wherein said damping element includes a sheet of copper.

12. A planetary unit for providing gear reduction between a drive axle and tire hub, comprising:

a) a centrally located sun gear operatively connected to the drive axle;

b) a plurality of planet gears in co-meshing relationship with said sun gear;

c) a ring gear in co-meshing relationship with said planet gears and operatively connected to said hub;

d) a planetary cover/carrier assembly containing a fixed damping joint for converting vibrations generated by gear meshes of said planet gears into heat energy; and, e) said planetary cover/carrier assembly including a separate planetary cover and carrier with a sheet of structural damping material disposed and clamped between surfaces defined by said planetary cover and carrier.

13. A drive axle assembly for a land vehicle comprising:

a) a tire supporting hub mounted for rotation;

b) a drive axle;

c) a planetary unit for operatively coupling said drive axle to said hub, such that rotation in said drive axle produces rotation in said hub;

d) said planetary unit including:

i) a sun gear, at least one planet gear and a ring gear, said planet gear being in co-meshing engagement with said sun gear and said ring gear;

ii) a planetary unit cover including a gear carrier for operatively supporting at least one of said gears;

iii) a fixed damping joint located within said planetary unit for reducing the transmission of vibrations generated by gear meshes of said gears to said planetary cover; and, iv) said planetary cover including a cover portion and a carrier portion and said damping material comprises a sheet of structural damping material dissimilar to that of the material from which said cover and carrier portions are constructed, that is disposed intermediate said cover portion and said carrier portion.

* * * * *